United States Patent
Hajir et al.

(10) Patent No.: US 12,512,868 B2
(45) Date of Patent: Dec. 30, 2025

(54) METHOD AND APPARATUS FOR PARALLEL SELF-INTERFERENCE ESTIMATION AND CANCELLATION IN MULTIPLE TRANSMITTERS CARRIER AGGREGATION SYSTEMS

(71) Applicant: Samsung Electronics Co., Ltd., Gyeonggi-do (KR)

(72) Inventors: Mouna Hajir, San Diego, CA (US); Mojtaba Rahmati, San Diego, CA (US); Hyuk Joon Kwon, San Diego, CA (US)

(73) Assignee: Samsung Electronics Co., Ltd. (KR)

( * ) Notice: Subject to any disclaimer, the term of this patent is extended or adjusted under 35 U.S.C. 154(b) by 98 days.

(21) Appl. No.: 18/490,348

(22) Filed: Oct. 19, 2023

(65) Prior Publication Data

US 2024/0348274 A1  Oct. 17, 2024

Related U.S. Application Data

(60) Provisional application No. 63/458,750, filed on Apr. 12, 2023.

(51) Int. Cl.
*H04B 1/04* (2006.01)
(52) U.S. Cl.
CPC ................. *H04B 1/0475* (2013.01)
(58) Field of Classification Search
CPC ......... H04B 1/0475; H04B 1/525; H04B 1/40
USPC .......... 375/261–262, 295–297, 324
See application file for complete search history.

(56) References Cited

U.S. PATENT DOCUMENTS

| | | | |
|---|---|---|---|
| 7,209,511 B2 | 4/2007 | Dent | |
| 7,546,105 B2 | 6/2009 | Pitrainen | |
| 9,698,836 B2 | 7/2017 | Qin et al. | |
| 9,847,865 B2 | 12/2017 | Moher | |
| 9,923,658 B2 | 3/2018 | Xue et al. | |
| 10,193,683 B2 * | 1/2019 | Chen | H04B 7/0413 |
| 10,243,719 B2 | 3/2019 | Bharadia et al. | |
| 11,862,194 B1 * | 1/2024 | Cideciyan | G11B 20/10009 |
| 2014/0212132 A1 * | 7/2014 | Saito | H04L 25/03 398/152 |

(Continued)

FOREIGN PATENT DOCUMENTS

| | | |
|---|---|---|
| EP | 3 065 361 | 5/2019 |
| EP | 3 048 739 | 6/2021 |
| JP | 11-234182 | 8/1999 |

OTHER PUBLICATIONS

Waheed, Muhammad Zeeshan, "Self-Interference Cancellation in Interband Carrier Aggregation Transceivers", MS thesis, 2017, https://trepo.tuni.fi/handle/123456789/25006, pp. 64.

(Continued)

Primary Examiner — Emmanuel Bayard
(74) Attorney, Agent, or Firm — The Farrell Law Firm, P.C.

(57) ABSTRACT

A system and a method are disclosed and include generating a first kernel based on a tap of a first transmission and a plurality of taps of a second transmission; calculating a first weighted coefficient set based on the first kernel; calculating a first self-interference transmission signal estimation based on the first weighted coefficient set; and obtaining a first cancellation signal by subtracting the first self-interference transmission signal estimation from a downlink received signal.

20 Claims, 9 Drawing Sheets

(56) References Cited

U.S. PATENT DOCUMENTS

| | | | | |
|---|---|---|---|---|
| 2015/0156004 A1* | 6/2015 | Khandani | H04L 1/0031 |
| | | | 370/278 |
| 2015/0229401 A1* | 8/2015 | Tanaka | H04B 10/614 |
| | | | 398/135 |
| 2016/0071009 A1* | 3/2016 | Abrishamkar | G06N 3/08 |
| | | | 706/25 |
| 2016/0173165 A1* | 6/2016 | Choi | H04B 1/525 |
| | | | 455/78 |
| 2018/0006794 A1* | 1/2018 | Lee | H04L 5/14 |
| 2018/0026775 A1* | 1/2018 | Chen | H04B 1/525 |
| | | | 370/278 |
| 2019/0229884 A1* | 7/2019 | Xue | H04B 15/00 |
| 2023/0318737 A1* | 10/2023 | Komninakis | H04L 27/367 |
| | | | 370/329 |
| 2023/0336321 A1* | 10/2023 | Sim | H04L 5/1461 |
| 2024/0162922 A1* | 5/2024 | Drogi | H03F 3/245 |
| 2024/0397432 A1* | 11/2024 | Zorgui | H04W 52/367 |

OTHER PUBLICATIONS

Gebhard, Andreas, "Self-Interference Cancellation and Rejection in FDD RF-Transceivers", Diss. Universität Linz, 2019, https://epub.jku.at/obvulihs/content/titleinfo/3685798, pp. 170.

* cited by examiner

METHOD AND APPARATUS FOR PARALLEL SELF-INTERFERENCE ESTIMATION AND CANCELLATION IN MULTIPLE TRANSMITTERS CARRIER AGGREGATION SYSTEMS

CROSS-REFERENCE TO RELATED APPLICATION

This application claims the priority benefit under 35 U.S.C. § 119(e) of U.S. Provisional Application No. 63/458,750, filed on Apr. 12, 2023, the disclosure of which is incorporated by reference in its entirety as if fully set forth herein.

TECHNICAL FIELD

The disclosure generally relates to wireless communication systems. More particularly, the subject matter disclosed herein relates to improvements to estimating and canceling self-interference in carrier aggregation systems involving multiple transmitters (TX) with different impulse responses.

SUMMARY

Carrier aggregation systems in wireless communications frequently involve the use of multiple TXs for uplink transmission. The self-interference arising from such systems can be modeled by interference components, such as intermodulation 2 (IMD2) and intermodulation 3 (IMD3), which need to be estimated and accounted for to enhance system performance.

Intermodulation distortion occurs when multiple signals at different frequencies interact within a non-linear system, leading to the generation of new unwanted frequencies (intermodulation products) that were not present in the original signals. IMD2 refers to the second-order intermodulation products, which are the sum and difference of two input frequencies. IMD3 refers to the third-order intermodulation products, which are the sum and difference of three input frequencies.

In the context of wireless communication systems, IMD2 and IMD3 are important to consider, especially in multi-carrier systems like carrier aggregation. When multiple transmitters operate in close proximity to each other, their signals may interact non-linearly, resulting in IMD2 and IMD3 components. These unwanted distortion products can cause interference and degrade the system's performance, affecting signal quality, data rates, and overall spectral efficiency.

To mitigate the effects of IMD2 and IMD3, techniques like self-interference estimation and cancellation can be employed. These techniques help reduce the impact of intermodulation distortion, allowing for improved performance in carrier aggregation systems involving multiple transmitters.

One of the challenges with conventional technologies lies in the estimation of self-interference. In single input single output (SISO) structures, the number of taps required for estimating the interference is usually low, and conventional methods typically utilize about 5 taps, keeping the complexity manageable. A "tap" refers to a discrete time instance or element within the vector representing a kernel component. However, with the conventional multiple input single output (MISO) structure, the number of taps can significantly increase. For example, if 5 taps are utilized, in the case of considering cross terms for IMD2, 25 taps may be required for estimation (e.g., 5*5).

The conventional recursive least square (RLS) method for self-interference estimation may necessitate computationally intensive operations, such as matrix inversions or iterative calculations. To address this, it becomes essential to keep the number of taps (corresponding to the length of x and h in the system model) low.

In this context, the present application proposes a parallel or sequential estimation method to reduce computational complexity while achieving effective self-interference estimation and cancellation, as described below.

In an embodiment, a method includes generating a first kernel based on a tap of a first transmission and a plurality of taps of a second transmission; calculating a first weighted coefficient set based on the first kernel; calculating a first self-interference transmission signal estimation based on the first weighted coefficient set; and obtaining a first cancellation signal by subtracting the first self-interference transmission signal estimation from a downlink received signal.

In an embodiment, an electronic device includes a memory device, and a processor configured to execute instructions stored on the memory device. The instructions cause the processor to generate a first kernel based on a tap of a first transmission and a plurality of taps of a second transmission; calculate a first weighted coefficient set based on the first kernel; calculate a first self-interference transmission signal estimation based on the first weighted coefficient set; and obtain a first cancellation signal by subtracting the first self-interference transmission signal estimation from a downlink received signal.

BRIEF DESCRIPTION OF THE DRAWING

In the following section, the aspects of the subject matter disclosed herein will be described with reference to exemplary embodiments illustrated in the figures, in which.

DETAILED DESCRIPTION

Figure 1:
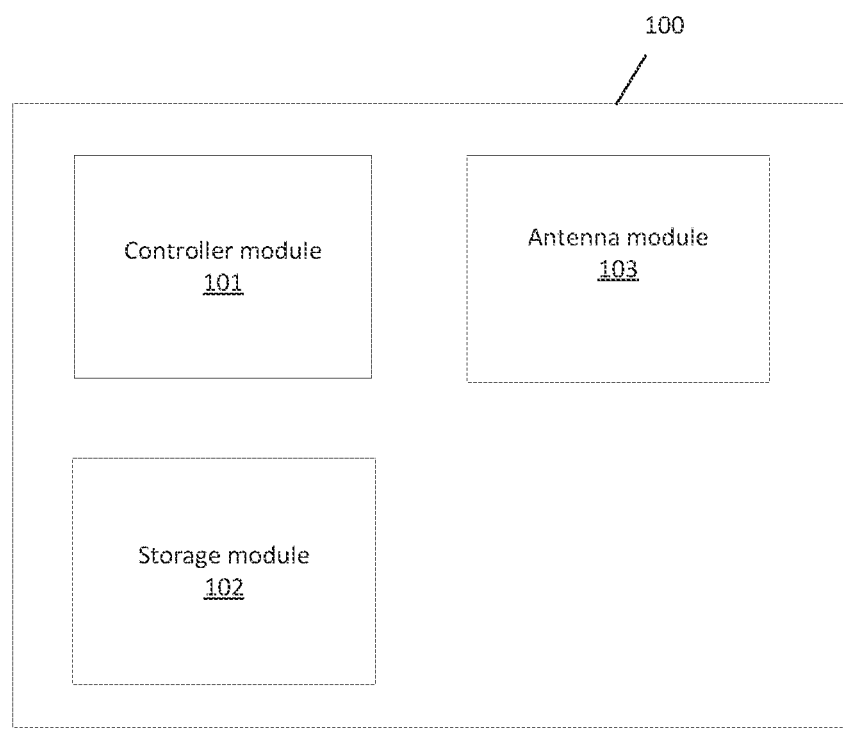
FIG. 1 illustrates a transmitting device or a receiving device in a communication system, according to an embodiment.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

FIG. 1 illustrates a transmitting device or a receiving device in a communication system, according to an embodiment.

Referring to FIG. 1, the device 100 (e.g., an electronic device) may be a UE (e.g., a client device) or a base station (e.g., a gNB) and includes a controller module 101 (e.g., a processor), a storage module 102, and an antenna module 103.

The controller module 101, storage module 102, and antenna module 103 may be structural components to facilitate efficient and accurate transmission or reception of wireless signals.

The controller module 101 may include at least one processor and may execute instructions that are stored in the storage module 102. For example, the controller module 101 may execute instructions for performing signaling techniques described herein. In addition, the controller module 101 may include a digital signal processor (DSP) for performing signal processing on a signal. The DSP may include one or more processing modules for functions such as synchronization, equalization, and demodulation. The processing modules may be implemented using one or more DSP techniques, such as fast Fourier transform (FFT), inverse FFT (IFFT), and digital filtering. Additionally or alternatively, the controller module 101 may include an application processor for running user applications on the device 100, such as web browsers, video players, and other software applications. The application processor may include one or more processing units, memory devices, and input/output interfaces.

The controller module 101 may additionally estimate error of received or transmitted signals prior to, during, or after transmission or reception. For example, the controller module 101 may control the antenna 103 to receive a signal. After the signal is received, the controller module 101 may estimate an amount of error associated with the signal to estimate a received signal with improved accuracy.

The storage module 102 may include transitory or non-transitory memory storing instructions that, when executed, cause the controller module 101 to perform steps to execute signaling techniques described herein. In addition, the storage module 102 may include a protocol stack for implementing communication protocols. The protocol stack may include one or more layers, such as a physical layer, a medium access control (MAC) layer, a radio link control (RLC) layer, and a packet data convergence protocol (PDCP) layer.

The antenna module 103 may include one or more antennas for wirelessly transmitting and receiving signals to a base station, UE or another device. For example, the antenna module 103 may receive a signal transmitted by a base station and convert it into an electrical signal.

The device 100 may be a receiver of a wireless communication system (e.g., the UE in a 5G NR system) in downlink, i.e., the UE receives and demodulates data transmitted by the gNB. In addition, the device 100 may also transmit a signal via the antenna module 103 and, therefore, may be a transmitter or a gNB.

Figure 2:
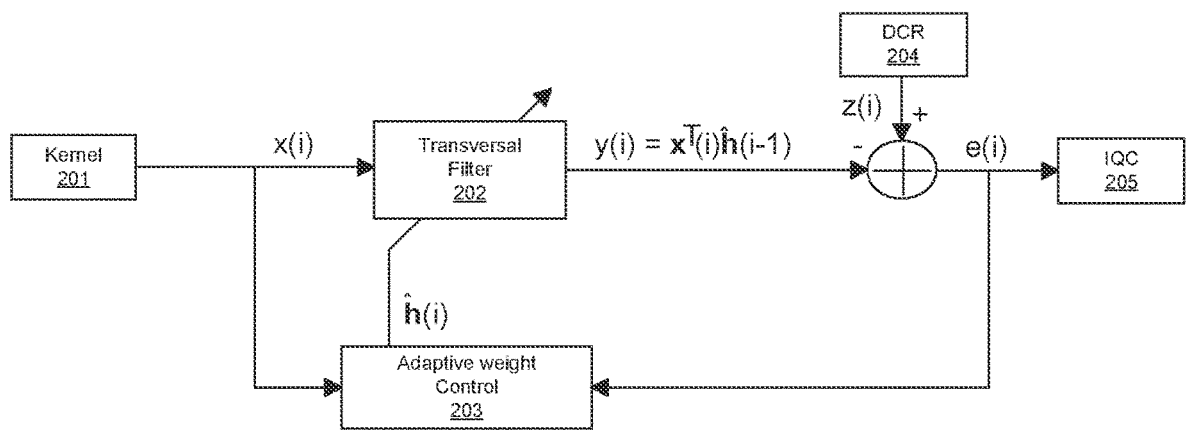
FIG. 2 is a block diagram illustrating an adaptive wave control model of self-interference cancellation, according to an embodiment.

FIG. 2 is a block diagram illustrating an adaptive wave control model of self-interference cancellation, according to an embodiment.

Referring to FIG. 2, a kernel 201 mixes a plurality of input TXs. For example, $x_1(t)$ may correspond to a signal transmitted from a first transmitter ($TX_1$), and $x_2(t)$ may correspond to a signal transmitted from a second transmitter ($TX_2$). A transmitter may be a device described in FIG. 1, such as a UE or a BS.

The kernel 201 components used for self-interference estimation may be based on an interference modeling approach, such as IMD2 and IMD3, particularly when multiple TXs are used for uplink transmission. In the case of IMD2, the kernel 201 output x(i) may be based on the cross product or the conjugate of $x_1(t)$ and $x_2(t)$, and in the case of IMD3, the kernel 201 output x(i) may further be based on a square of one of $x_1(t)$ or $x_2(t)$, or a square of one of $x_1(t)$ or $x_2(t)$'s conjugate's.

The transversal filter 202 applies an input vector x(i) at each time instance i, which is weighted by $h^-(i-1)$, provided by the adaptive weight control 203, to produce an output signal y(i). This output signal y(i) is then compared to the downlink signal z(i) provided by direct conversion receiver (DCR) 204 to output the error signal e(i), which is provided to the in phase and quadrature I/Q correction module (IQC) 205 for demodulation. The error signal e(i) may also be provided to the adaptive weight control 203.

In the context of transmission signal interference cancellation (TSIC), x(i) and z(i) represent the vector of non-linear kernel components (known for each model of interference) and the received signal, respectively. The received signal z(i) includes both desired and interference signals, as well as noise, at a specific time instance (i).

Some TSIC structures, referred to as SISO, assume that two sources of interference are mixed as cross-modulation products before experiencing a common frequency response. For example, in the case of IMD2, the underlying SISO interference modeling assumes the product of $x_1$ and $x_2$ at each time instance (i). For example, for 5 time instances, the SISO interference modeling may assume:

$$x_1[-2]x_2[-2];\ x_1[-1]x_2[-1];\ x_1[0]x_2[0];\ x_1[1]x_2[1];\ x_1[2]x_2[2]$$

In the present application, a sequential or parallel estimation method is provided to form kernels separately on each TX, allowing for the separate estimation of two sets of coefficients before calculating a final self-interference signal using the two coefficients sets.

Accordingly, a MISO-TSIC structure may be adopted to separately track the independent frequency responses experienced by each TX interference source, as depicted below for $x_1$ (corresponding to $TX_1$) and $x_2$ (corresponding to $TX_2$) in IMD2:

$$x_1[-2]x_2[-2];\ \ldots\ x_1[-1]x_2[0];\ x_1[0]x_2[-1];$$
$$x_1[0]x_2[0];\ x_1[0]x_2[1];\ x_1[1]x_2[0];\ \ldots\ ;\ x_1[2]x_2[2]$$

Parallel estimation of self-interference from two sources (e.g., $TX_1$ and $TX_2$) will now be described. Although two TX sources are described in the embodiment, more may be used.

Figure 3:
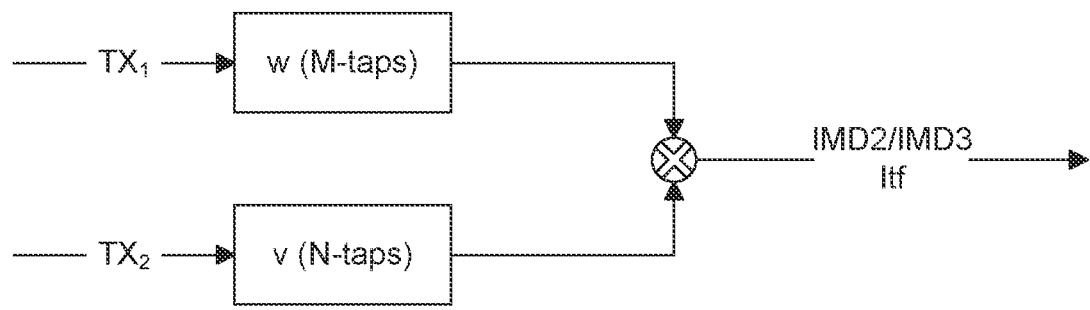
FIG. 3 is a block diagram illustrating an impulse response in a two TX system, according to an embodiment.

FIG. 3 is a block diagram illustrating an impulse response in a two TX system, according to an embodiment.

Referring to FIG. 3, two transmitters, $TX_1$ and $TX_2$, each experience their own impulse response modeled by an n-tap w filter and an m-tap v filter, respectively. "m" may correspond to the number of taps in $TX_1$, "n" may correspond to the number of taps in $TX_2$, or vice versa. The parallel outputs (or parallel "paths") from the n-tap w filter and the m-tap v filter are combined and output (e.g., as IMD2 or IMD3 Interference (Itf) (e.g., self-interference)).

To reduce the computational complexity, the total number of taps should be low.

With a SISO structure, estimating interference usually involves a low number of taps, typically sufficient to handle self-interference. However, with the MISO structure, the number of taps can significantly increase, potentially reaching up to $n \times m^2$ taps (e.g., in the case of IMD3).

Accordingly, a method proposed herein includes a parallel estimation approach to tackle the increased complexity in the MISO structure. This approach involves the formation of kernels considering different paths. For example, one path considers only 1 tap in $TX_1$ and all m taps in $TX_2$, while the other path considers n taps in $TX_1$ and only 1 tap in $TX_2$.

This parallel estimation may be used to predict coefficients $c_1$ and $c_2$. These coefficients $c_1$ and $c_2$ are derived from $v_0[w_{-2}\ w_{-1}\ w_0\ w_1\ w_2]^T$ and $w_0[v_{-2}\ v_{-1}\ v_0\ v_1\ v_2]^T$, respectively. v and w represent filters that are convolved with the each parameter included in the vectors $x_1$ and $x_2$, respectively, and $[\ ]^T$ is the transpose of the vector, a mathematical operation involving switching the orientation of the vector from horizontal to vertical (or vice versa).

After obtaining the coefficients, the TX estimated signal may be reformed (adjusted) using $c_1$, $c_2$, $x_1$ and $x_2$. At each RLS iteration, the non-linear uplink signal at time instance (i) may be reformed (kernel may be reformed (calculated) by applying separated estimated filters) according to Equation 1, below:

$$\text{tx\_signal\_est}(i) = \frac{c_1^H x_1(i) c_2^H x_2(i)}{\frac{c_{1,0} + c_{2,0}}{2}} \quad \text{Equation 1}$$

where the estimated signal at time instance (i) is given by tx_signal_est(i).

For each sample (i) (RLS iteration), $x_1$ and $x_2$ are vectors of size equal to the number of estimation taps, for example, in the case of 5 taps, $x_1$ may be defined by Equation 2 and $x_2$ may be defined by Equation 3, below:

$$x_1(i) = [tx1(i-2) \ tx1(i-1) \ tx1(i) \ tx1(i+1) \ tx1(i+2)]^T \quad \text{Equation 2}$$

$$x_2(i) = [tx2(i-2) \ tx2(i-1) \ tx2(i) \ tx2(i+1) \ tx2(i+2)]^T \quad \text{Equation 3}$$

By utilizing a parallel estimation method for each sample i, computational complexity can be reduced while achieving an accurate self-interference estimation in carrier aggregation systems with multiple transmitters.

Figure 4A:
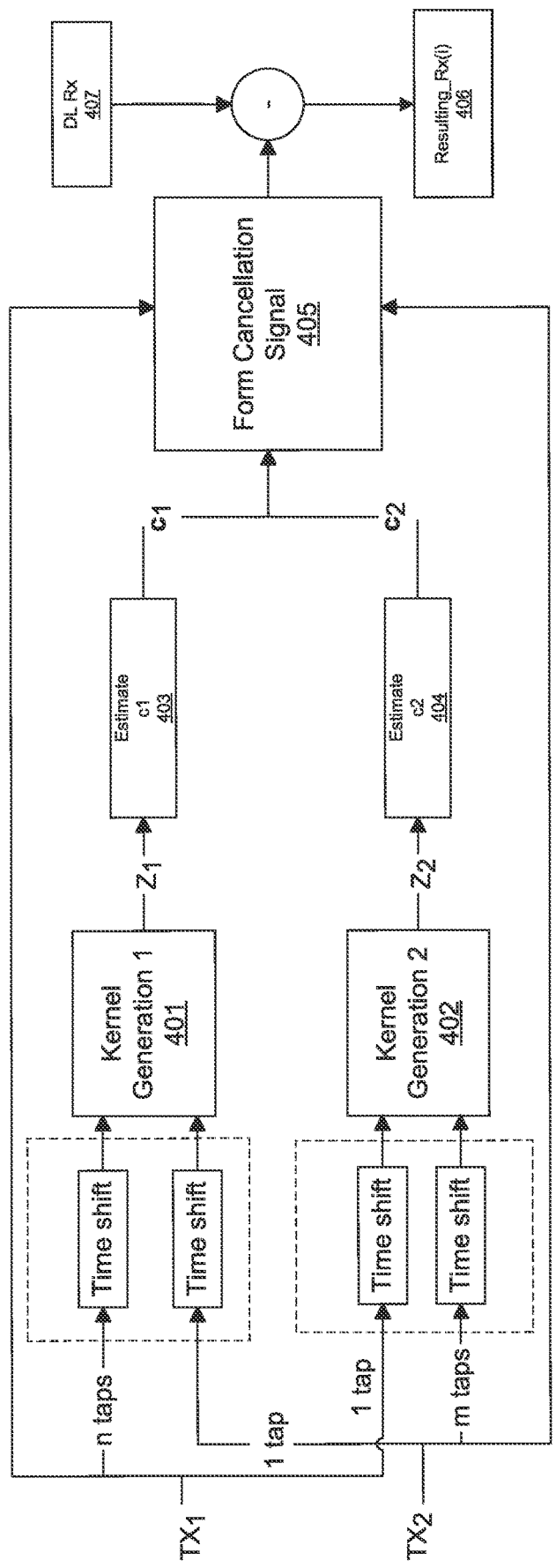
FIG. 4A is a block diagram illustrating parallel estimation for self-interference cancellation, according to an embodiment.

FIG. 4A is a block diagram illustrating parallel estimation for self-interference cancellation, according to an embodiment. That is, two parallel estimation paths may be applied to obtain $c_1$ and $c_2$, which can then be used to form the estimated signal to be cancelled (tx_signal_est(i)) based on Equation 1, above.

Referring to FIG. 4A, $TX_1$ and $TX_2$ are provided as inputs. Kernel Generation 1 401 and Kernel Generation 2 402 may output $Z_1$ and $Z_2$, which may be formed separately by time shifting $TX_1$ with m=5 and n=1 (e.g., corresponding to 5 taps in the $TX_1$ path and 1 tap in the $TX_2$ path) to form $Z_1$ and time shifting $TX_2$ with m=1 and n=5 (corresponding to 1 tap in the $TX_1$ path and 5 taps in the $TX_2$ path) such that $Z_1$ and $Z_2$ may be provided according to Equations 4-5, below:

$$Z_1 = \quad \text{Equation 4}$$
$$[x_1[-2]x_2[0]; x_1[-1]x_2[0]; x_1[0]x_2[0]; x_1[1]x_2[0]; x_1[2]x_2[0]]$$

$$Z_2 = \quad \text{Equation 5}$$
$$[x_1[0]x_2[-2]; x_1[0]x_2[-1]; x_1[0]x_2[0]; x_1[0]x_2[1]; x_1[0]x_2[2]]$$

Although the example of 5 taps is described above in relation to time shifting, more or fewer taps may be applied in accordance with the present embodiment. In addition, it may be understood that, after synchronization, the "center" tap, or in this case, "[0]" (e.g., $x_1[0]$ and $x_2[0]$) is a signal associated with the tap having the strongest magnitude relative to signals associated at signals arriving at other time samples (e.g., [−2], [−1], [1], and [2]). Synchronization is performed around the center (or strongest) signal, so that cancellation is performed with respect to the strongest (center) tap, thereby providing the highest amount of error correction of the downlink signal.

After kernels $Z_1$ and $Z_2$ are obtained, coefficients $c_1$ and $c_2$ may be estimated at blocks 403 and 404, respectively, by any well-known estimation method (e.g., RLS, gradient descent, or dichotomous coordinate descent (DCD)-RLS), and $c_1$ and $c_2$ may be provided according to Equations 6-7, below:

$$c_1 = [c_{1,-2} \ c_{1,-1} \ c_{1,0} \ c_{1,1} \ c_{1,2}]^T \quad \text{Equation 6}$$

$$c_2 = [c_{2,-2} \ c_{2,-1} \ c_{2,0} \ c_{2,1} \ c_{2,2}]^T \quad \text{Equation 7}$$

The estimated coefficients $c_1$ and $c_2$ are each comprised of a set of coefficient values. The number of coefficients values in each set may be based on the number of taps considered for each TX (e.g., $TX_1$ and $TX_2$), as well as the type of distortion that is being considered. The estimated coefficients $c_1$ and $c_2$ may be applied to Equation 1, above, corresponding to time instance i, to obtain the estimated self-interference tx_signal_est(i) at block 405. A resulting_RX(i) after TSIC may be provided at block 406 by subtracting the tx_signal_est(i) from the downlink received signal Rx(i) 407, according to Equation 8, below:

$$\text{resulting } Rx(i) = Rx(i) - \text{tx\_signal\_est}(i) \quad \text{Equation 8}$$

The steps involved in the parallel estimation for self-interference cancellation, discussed above, may be performed recursively for each time instance i.

Figure 4B:
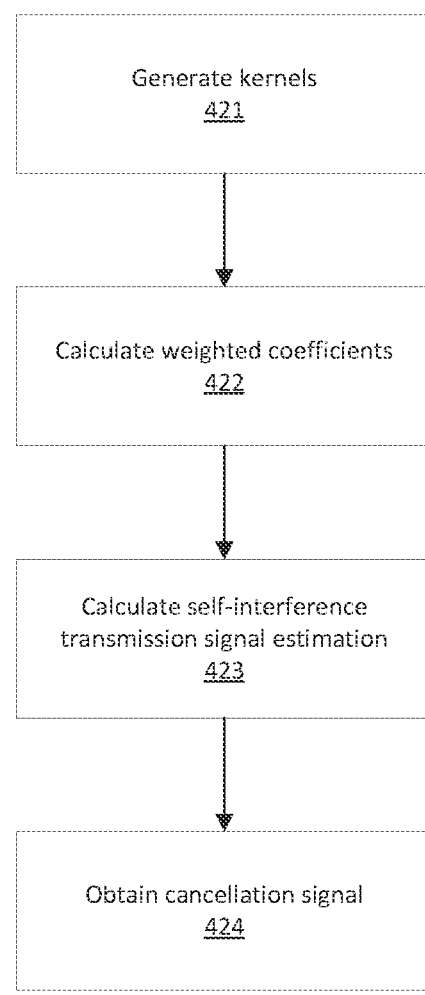
FIG. 4B is a flowchart illustrating a method of parallel estimation for self-interference cancellation, according to an embodiment.

FIG. 4B is a flowchart illustrating a method of parallel estimation for self-interference cancellation, according to an embodiment.

FIG. 4B illustrates a method of parallel estimation for self-interference cancellation. The parallel self-interference estimation steps may be performed at different time instances i, and for various numbers of taps m and n. Additionally, some or all of the steps illustrated in FIG. 4B may be performed by the controller module 101 included in the device 100 based on execution of instructions stored in the storage module 102.

Referring to FIG. 4B, in step 421, an electronic device (e.g., a UE or BS) generates a plurality kernels. This step may encompass the functions performed in blocks 401 and 402 in FIG. 4A. As stated above, the kernel of block 401 is generated based on 1-tap in $TX_2$ and n-taps in $TX_2$. The kernel of block 402 is generated based on 1-tap in $TX_1$ and m-taps in $TX_2$. Notably, both of the kernels may be generated in parallel (simultaneously), and used to calculate a plurality of weighted coefficients in each parallel path in step 422 (e.g., a first coefficient corresponding to block 403 and a second coefficient corresponding to block 404).

In step 423, a self-interference transmission signal estimation (e.g., tx_signal_est1(i)) is calculated based on the plurality of weighted coefficients and according to Equation 1, above. This step is similar to the functions performed based on block 405 in FIG. 4A.

In step 424, a cancellation signal is obtained by, for example, subtracting the self-interference transmission signal estimation from a downlink received signal.

Steps 421-424 occur such that a plurality of weighted coefficients are simultaneously calculated based on data input vectors corresponding to one tap in a first transmission cross referenced with a plurality of taps in a second transmission, and one tap in the second transmission cross referenced with a plurality of taps in the first transmission (e.g., 1-tap in $TX_2$ and n-taps in $TX_2$; and 1-tap in $TX_1$ and m-taps in $TX_2$). This unique arrangement enables weighted coefficients to be efficiently calculated in parallel and applied together to form a cancellation signal based on the arrangement of taps of $TX_1$ and $TX_2$, described above.

According to an embodiment, a sequential estimation for self-interference cancellation may also be provided.

Figure 5A:
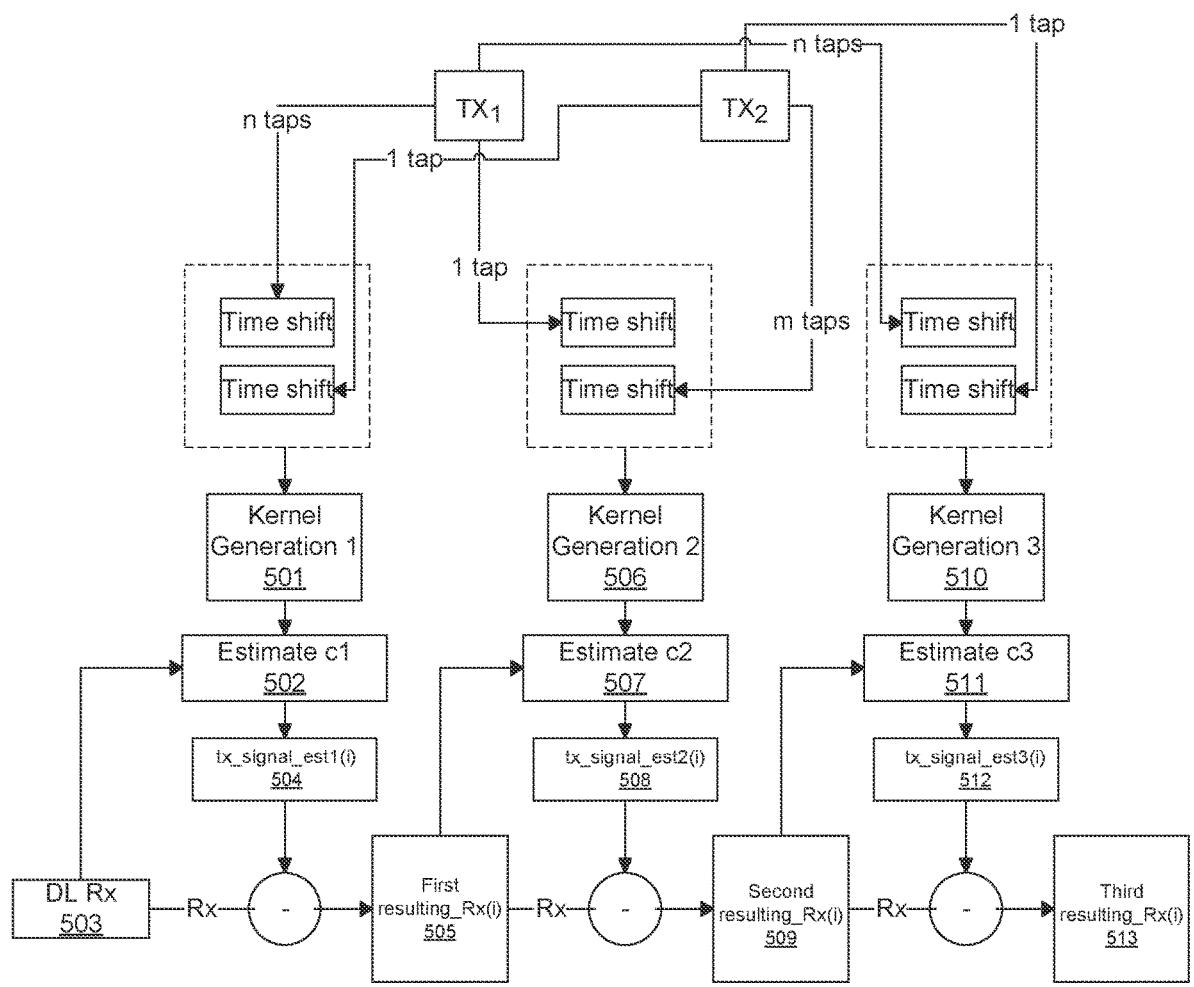
FIG. 5A is a block diagram illustrating sequential estimation for self-interference cancellation, according to an embodiment.

FIG. 5A is a block diagram illustrating sequential estimation for self-interference cancellation, according to an embodiment.

Referring to FIG. 5A, $TX_1$ and $TX_2$ are provided as inputs. At each time instance (i), a first kernel is generated at block 501 based on n-taps in $TX_1$ and a 1-tap in $TX_2$ to estimate coefficient $c_1$ at block 502 using a preferred estimation method (e.g., RLS, gradient descent, or DCD-RLS). The downlink Rx signal 503 may also be used to calculate the coefficient $c_1$.

A first cancellation path can be estimated at block 504 using coefficient $c_1$ according to Equation 9, below:

$$\text{tx\_signal\_est1}(i) = c_1^H x_1(i) \qquad \text{Equation 9}$$

The first estimated self-interference cancellation path tx_signal_est1(i) may be subtracted from the downlink received signal 503 at time instance (i) to obtain a first resulting_Rx(i) 505 after a first TSIC cancellation based on Equation 8, above.

A second kernel is generated at block 506 based on 1-tap in $TX_1$ and m-taps in $TX_2$ to estimate coefficient $c_2$ at block 507 using a preferred estimation method (e.g., RLS, gradient descent, or DCD-RLS). The first resulting Rx(i) 505 may also be used to calculate the coefficient $c_2$ at block 507.

A second cancellation path can be estimated using coefficient $c_2$ according to Equation 10, below:

$$\text{tx\_signal\_est2}(i) = c_2^H x_2(i) \qquad \text{Equation 10}$$

The second estimated self-interference cancellation path tx_signal_est2(i) 508 may be subtracted from the first resulting_Rx(i) 505 to obtain a second resulting_Rx(i) 509 based on Equation 8, above.

A third kernel is generated at block 510 based on 1-tap in $TX_1$ and m-taps in $TX_2$, which is then used to estimate coefficient $c_3$ at block 511 using a preferred estimation method (e.g., RLS, gradient descent, or DCD-RLS). The second resulting Rx(i) 509 may also be used to calculate the coefficient $c_3$ at block 511.

A third cancellation path can be estimated using coefficient $c_3$ according to Equation 11, below:

$$\text{tx\_signal\_est3}(i) = c_3^H x_2(i) \qquad \text{Equation 11}$$

The third estimated self-interference cancellation path tx_signal_est3(i) 512 may be subtracted from the second resulting_Rx(i) 509 to obtain a third resulting_Rx(i) 513 based on Equation 8, above.

The sequential self-interference estimation steps, described above with reference to FIG. 5A, may continue to be performed to obtain additional signals (a fourth resulting_Rx(i), a fifth resulting_Rx(i), a sixth resulting_Rx(i), etc.). Additionally, the estimated coefficients $c_1$, $c_2$, and $c_3$ are each comprised of a set of coefficient values. The number of coefficients values in each set may be based on the number of taps considered for each TX (e.g., $TX_1$ and $TX_2$), as well as the type of distortion that is being considered.

Figure 5B:
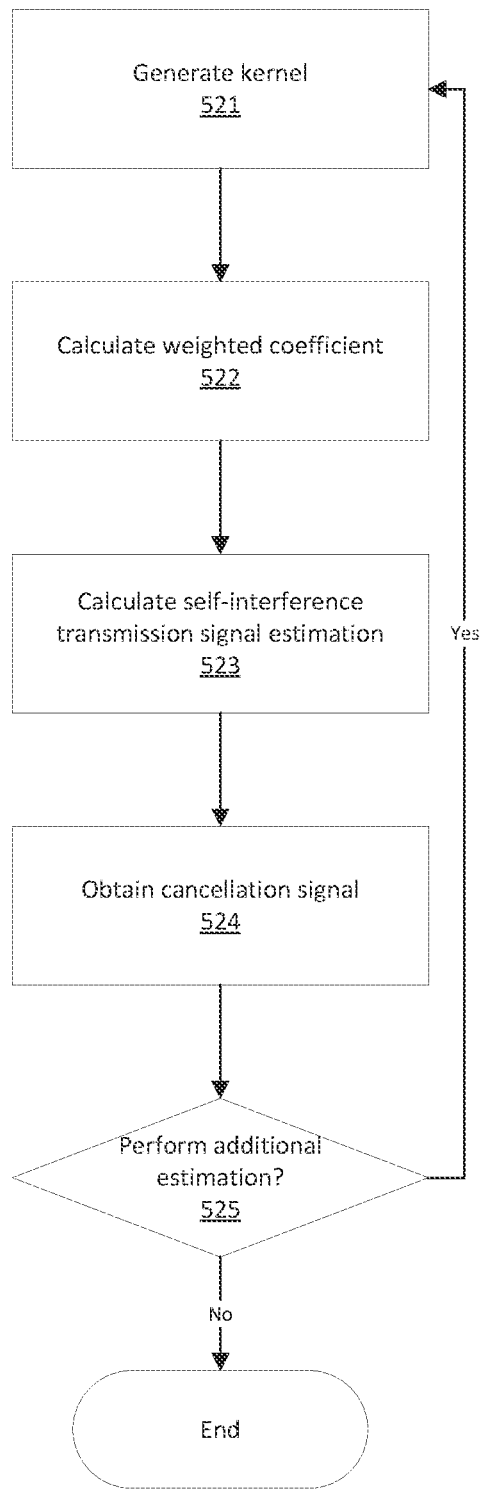
FIG. 5B is a flowchart illustrating a method of sequential estimation for self-interference cancellation, according to an embodiment.

FIG. 5B is a flowchart illustrating a method of sequential estimation for self-interference cancellation, according to an embodiment.

FIG. 5B illustrates the recursive nature of sequential estimation. As stated above, sequential self-interference estimation steps may continue to be performed to obtain successive resulting_Rx(i)'s in order to improve the overall signal error estimation. In addition, the sequential self-interference estimation steps may be performed at different time instances (i), and for various numbers of taps m and n.

Referring to FIG. 5B, in step 521, an electronic device (e.g., a UE or BS) generates a kernel. This step is similar to the kernel generation routine described with reference to block 501 in FIG. 5A. As stated above, the kernel is generated based on 1-tap in $TX_1$ and m-taps in $TX_2$.

In step 522, a weighted coefficient (e.g., $c_1$) is calculated. The weighted coefficient is calculated based on the kernel generated in step 521 (which is determined based on one-tap in one TX, and a plurality of taps in another TX), as well as a downlink received signal and/or an error correction signal (e.g., a resulting_RX(i)). Step 522 is similar to block 502 in FIG. 5A.

In step 523, a self-interference transmission signal estimation (e.g., tx_signal_est1(i)) is calculated. This step is similar to the process corresponding to block 504 in FIG. 5A. As stated above, the self-interference transmission signal may be estimated based on the weighted coefficient.

In step 524, a cancellation signal is obtained by, for example, subtracting the self-interference transmission signal from a downlink received signal and/or an error correction signal. Step 524 is similar the process of obtaining the resulting_Rx(i) in block 505 of FIG. 5A.

Steps 521-524, may each be performed for multiple time instances (i)'s. Additionally, steps 521-524 may be repeated sequentially to obtain a second resulting_Rx(i) (e.g., corresponding to block 509 in FIG. 5A), a third resulting_Rx(i) (e.g., corresponding to block 513 in FIG. 5A), etc., for each time instance (i). The decision of whether to sequentially repeat steps 521-524 to obtain additional error correction signals is determined at step 525. If additional error correction signals, are desired (Yes at step 525), the routine returns to Step 521. Otherwise (No in step 525), the routine may be finished.

The decision at step 525 of whether to repeat (Yes) or to finish the routine (No) can be determined based on one or more factors. Since the embodiment happens sequentially, there is a time delay factor in between calculating first, second, and third resulting_Rx(i)s (corresponding to steps 505, 509, and 513). Minimizing the time delay is ideal for a system to operate quickly. However, in some cases, achieving a preferred amount of error correction of the DL Rx 503 (or a prior resulting-RX) may be preferred. Therefore, the decision in step 525 may be based on whether a time delay (e.g., an amount of time required to obtain a resulting_Rx) is less than or equal to a predefined value (e.g., Yes if less than or equal to a predefined value, and No if greater than the predefined value). Additionally, the decision in step 525 may be based on whether a preferred amount of error correction (e.g., a magnitude of error correction) of a prior Rx signal is within an acceptable predefined range (e.g., Yes if not in the predefined error correction range, and No if in the predefined error correction range). It is noted that the magnitude of error correction may be estimated based on the coefficient (e.g., determined in steps 502, 507, and 511).

After the routine is finished, an error of the DL reception signal may be precisely accounted for so that the electronic device (e.g., a UE or a BS), accurately estimates an error amount for each time instance upon receiving a DL signal.

That is, the proposed electronic device receives a signal, estimates an error of the signal, and processes the signal based on the estimated error.

Moreover, the proposed electronic device and error correction solution only use a fraction of the amount of processing power necessary to account for errors in a downlink Rx signal. Other solutions and devices require significantly more processing to obtain similar results. The present application employs the novel approach of parallel or sequential error estimation using (e.g., cross multiplying via IMD2/IMD3) a single tap for a first TX, and a plurality of taps for a second TX for each path.

As described above, the present Application is directed to an electronic device (e.g., a UE or a BS), and a method of using it. The electronic device may be used in a wireless communication network, and may correspond to electronic device 601, electronic device 604, or electronic device 602, described below.

Figure 6:
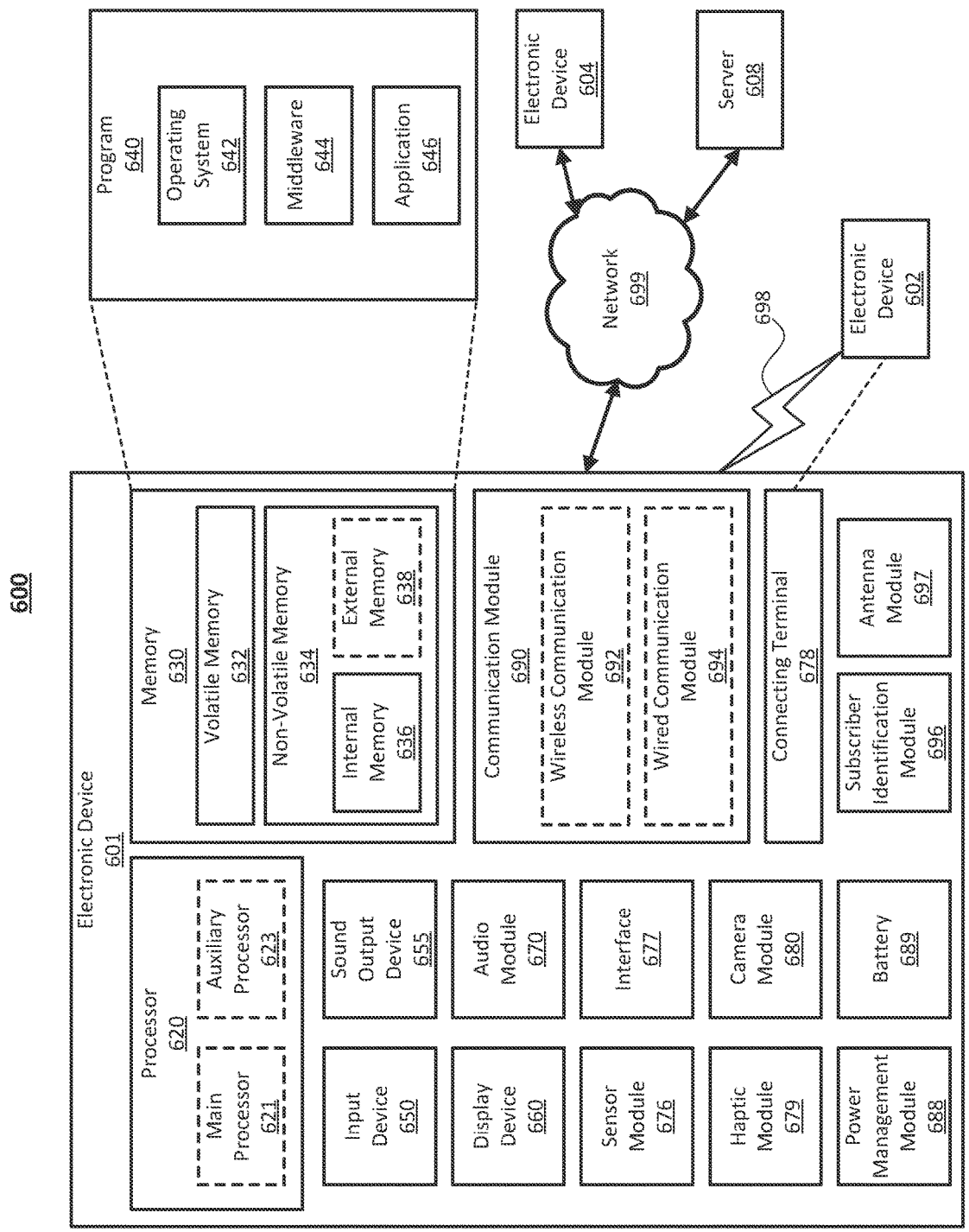
FIG. 6 is a block diagram of an electronic device in a network environment, according to an embodiment.

FIG. 6 is a block diagram of an electronic device in a network environment 600, according to an embodiment.

Referring to FIG. 6, an electronic device 601 in a network environment 600 may communicate with an electronic device 602 via a first network 698 (e.g., a short-range wireless communication network), or an electronic device 604 or a server 608 via a second network 699 (e.g., a long-range wireless communication network). The electronic device 601 may communicate with the electronic device 604 via the server 608. The electronic device 601 may include a processor 620, a memory 630, an input device 650, a sound output device 655, a display device 660, an audio module 670, a sensor module 676, an interface 677, a haptic module 679, a camera module 680, a power management module 688, a battery 689, a communication module 690, a subscriber identification module (SIM) card 696, or an antenna module 697. In one embodiment, at least one (e.g., the display device 660 or the camera module 680) of the components may be omitted from the electronic device 601, or one or more other components may be added to the electronic device 601. Some of the components may be implemented as a single integrated circuit (IC). For example, the sensor module 676 (e.g., a fingerprint sensor, an iris sensor, or an illuminance sensor) may be embedded in the display device 660 (e.g., a display).

The processor 620 may execute software (e.g., a program 640) to control at least one other component (e.g., a hardware or a software component) of the electronic device 601 coupled with the processor 620 and may perform various data processing or computations.

As at least part of the data processing or computations, the processor 620 may load a command or data received from another component (e.g., the sensor module 676 or the communication module 690) in volatile memory 632, process the command or the data stored in the volatile memory 632, and store resulting data in non-volatile memory 634. The processor 620 may include a main processor 621 (e.g., a central processing unit (CPU) or an application processor (AP)), and an auxiliary processor 623 (e.g., a graphics processing unit (GPU), an image signal processor (ISP), a sensor hub processor, or a communication processor (CP)) that is operable independently from, or in conjunction with, the main processor 621. Additionally or alternatively, the auxiliary processor 623 may be adapted to consume less power than the main processor 621, or execute a particular function. The auxiliary processor 623 may be implemented as being separate from, or a part of, the main processor 621.

The auxiliary processor 623 may control at least some of the functions or states related to at least one component (e.g., the display device 660, the sensor module 676, or the communication module 690) among the components of the electronic device 601, instead of the main processor 621 while the main processor 621 is in an inactive (e.g., sleep) state, or together with the main processor 621 while the main processor 621 is in an active state (e.g., executing an application). The auxiliary processor 623 (e.g., an image signal processor or a communication processor) may be implemented as part of another component (e.g., the camera module 680 or the communication module 690) functionally related to the auxiliary processor 623.

The memory 630 may store various data used by at least one component (e.g., the processor 620 or the sensor module 676) of the electronic device 601. The various data may include, for example, software (e.g., the program 640) and input data or output data for a command related thereto. The memory 630 may include the volatile memory 632 or the non-volatile memory 634. Non-volatile memory 634 may include internal memory 636 and/or external memory 638.

The program 640 may be stored in the memory 630 as software, and may include, for example, an operating system (OS) 642, middleware 644, or an application 646.

The input device 650 may receive a command or data to be used by another component (e.g., the processor 620) of the electronic device 601, from the outside (e.g., a user) of the electronic device 601. The input device 650 may include, for example, a microphone, a mouse, or a keyboard.

The sound output device 655 may output sound signals to the outside of the electronic device 601. The sound output device 655 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 660 may visually provide information to the outside (e.g., a user) of the electronic device 601. The display device 660 may include, for example, a display, a hologram device, or a projector and control circuitry to control a corresponding one of the display, hologram device, and projector. The display device 660 may include touch circuitry adapted to detect a touch, or sensor circuitry (e.g., a pressure sensor) adapted to measure the intensity of force incurred by the touch.

The audio module 670 may convert a sound into an electrical signal and vice versa. The audio module 670 may obtain the sound via the input device 650 or output the sound via the sound output device 655 or a headphone of an external electronic device 602 directly (e.g., wired) or wirelessly coupled with the electronic device 601.

The sensor module 676 may detect an operational state (e.g., power or temperature) of the electronic device 601 or an environmental state (e.g., a state of a user) external to the electronic device 601, and then generate an electrical signal or data value corresponding to the detected state. The sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more specified protocols to be used for the electronic device 601 to be coupled with the external electronic device 602 directly (e.g., wired) or wirelessly. The interface 677 may include, for example, a high-definition multimedia interface (HDMI), a universal serial bus (USB) interface, a secure digital (SD) card interface, or an audio interface.

A connecting terminal 678 may include a connector via which the electronic device 601 may be physically connected with the external electronic device 602. The connecting terminal 678 may include, for example, an HDMI connector, a USB connector, an SD card connector, or an audio connector (e.g., a headphone connector).

The haptic module 679 may convert an electrical signal into a mechanical stimulus (e.g., a vibration or a movement) or an electrical stimulus which may be recognized by a user via tactile sensation or kinesthetic sensation. The haptic module 679 may include, for example, a motor, a piezoelectric element, or an electrical stimulator.

The camera module 680 may capture a still image or moving images. The camera module 680 may include one or more lenses, image sensors, image signal processors, or flashes. The power management module 688 may manage power supplied to the electronic device 601. The power management module 688 may be implemented as at least part of, for example, a power management integrated circuit (PMIC).

The battery 689 may supply power to at least one component of the electronic device 601. The battery 689 may include, for example, a primary cell which is not rechargeable, a secondary cell which is rechargeable, or a fuel cell.

The communication module 690 may support establishing a direct (e.g., wired) communication channel or a wireless communication channel between the electronic device 601 and the external electronic device (e.g., the electronic device 602, the electronic device 604, or the server 608) and performing communication via the established communication channel. The communication module 690 may include one or more communication processors that are operable independently from the processor 620 (e.g., the AP) and supports a direct (e.g., wired) communication or a wireless communication. The communication module 690 may include a wireless communication module 692 (e.g., a cellular communication module, a short-range wireless communication module, or a global navigation satellite system (GNSS) communication module) or a wired communication module 694 (e.g., a local area network (LAN) communication module or a power line communication (PLC) module). A corresponding one of these communication modules may communicate with the external electronic device via the first network 698 (e.g., a short-range communication network, such as BLUETOOTH™, wireless-fidelity (Wi-Fi) direct, or a standard of the Infrared Data Association (IrDA)) or the second network 699 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 692 may identify and authenticate the electronic device 601 in a communication network, such as the first network 698 or the second network 699, using subscriber information (e.g., international mobile subscriber identity (IMSI)) stored in the subscriber identification module 696.

The antenna module 697 may transmit or receive a signal or power to or from the outside (e.g., the external electronic device) of the electronic device 601. The antenna module 697 may include one or more antennas, and, therefrom, at least one antenna appropriate for a communication scheme used in the communication network, such as the first network 698 or the second network 699, may be selected, for example, by the communication module 690 (e.g., the wireless communication module 692). The signal or the power may then be transmitted or received between the communication module 690 and the external electronic device via the selected at least one antenna.

Commands or data may be transmitted or received between the electronic device 601 and the external electronic device 604 via the server 608 coupled with the second network 699. Each of the electronic devices 602 and 604 may be a device of a same type as, or a different type, from the electronic device 601. All or some of operations to be executed at the electronic device 601 may be executed at one or more of the external electronic devices 602, 604, or 608. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 601. The electronic device 601 may provide the outcome, with or without further processing of the outcome, as at least part of a reply to the request. To that end, a cloud computing, distributed computing, or client-server computing technology may be used, for example.

Figure 7:
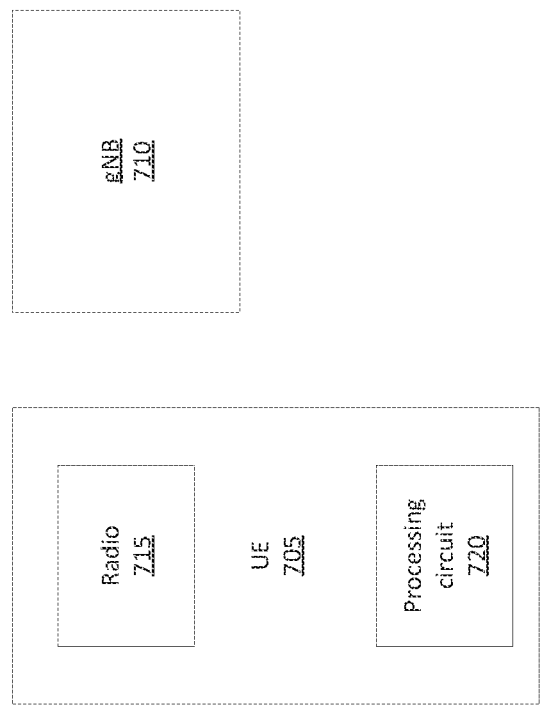
FIG. 7 illustrates a system including a user equipment (UE) and a network node (e.g., a base station), in communication with each other.

FIG. 7 illustrates a system including a UE and a gNB, in communication with each other.

Referring to FIG. 7, a system is shown including a UE 705 and a gNB 710, in communication with each other. The UE may include a radio 715 and a processing circuit (or a means for processing) 720, which may perform various methods disclosed herein. For example, the processing circuit 720 may receive, via the radio 715, transmissions from the network node (gNB) 710, and the processing circuit 720 may transmit, via the radio 715, signals to the gNB 710.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Additionally or alternatively, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method performed by an electronic device in a wireless network, the method comprising:
generating a first kernel based on a tap of a first transmission transmitted from a first transmitter and a plurality of taps of a second transmission transmitted from a second transmitter different from the first transmitter;
calculating a first weighted coefficient set based on the first kernel;
calculating a first self-interference transmission signal estimation based on the first weighted coefficient set; and
obtaining a first cancellation signal by subtracting the first self-interference transmission signal estimation from a downlink received signal,
wherein the first transmitter is a first wireless communication device comprising a first controller module, a first storage module, and a first antenna module that transmits the first transmission in the wireless network, and the second transmitter is a second wireless communication device comprising a second controller module, a second storage module, and a second antenna module that transmits the second transmission in the wireless network.

2. The method of claim 1, further comprising:
generating a second kernel based on a tap of the second transmission and a plurality of taps of the first transmission;
calculating a second weighted coefficient set based on the second kernel;
calculating a second self-interference transmission signal estimation based on the second weighted coefficient set; and
obtaining a second cancellation signal by subtracting the second self-interference transmission signal estimation from the first cancellation signal.

3. The method of claim 2, further comprising:
generating a third kernel based on the tap of the first transmission and the plurality of taps of the second transmission;
calculating a third weighted coefficient set based on the third kernel;
calculating a third self-interference transmission signal estimation based on the third weighted coefficient set; and
obtaining a third cancellation signal by subtracting the third self-interference transmission signal estimation from the second cancellation signal.

4. The method of claim 3, wherein calculating the first weighted coefficient set further comprises calculating the first weighted coefficient set based on the downlink received signal,
wherein calculating the second weighted coefficient set further comprises calculating the second weighted coefficient set based on the first cancellation signal, and
wherein calculating the third weighted coefficient set further comprises calculating the third weighted coefficient set based on the second cancellation signal.

5. The method of claim 1, wherein a total number of the plurality of taps of the first transmission is equal to a total number of the plurality of taps of the second transmission.

6. The method of claim 1, further comprising:
generating a second kernel based on a tap of the second transmission and a plurality of taps of the first transmission; and
calculating a second weighted coefficient set based on the second kernel,
wherein calculating the first self-interference transmission signal estimation further comprises calculating the first self-interference transmission signal estimation based on the first weighted coefficient set and the second weighted coefficient set.

7. The method of claim 6, wherein a total number of the plurality of taps of the first transmission is equal to a total number of the plurality of taps of the second transmission.

8. The method of claim 6, wherein calculating the first weighted coefficient further comprises multiplying a value corresponding to the tap of the first transmission with a plurality of values corresponding to each of the plurality of taps of the second transmission, and
wherein calculating the second weighted coefficient further comprises multiplying a value corresponding to the tap of the second transmission with a plurality of values corresponding to each of the plurality of taps of the first transmission.

9. The method of claim 6, wherein at least one of the first weighted coefficient and the second weighted coefficient is calculated based on a recursive least squares (RLS) estimation method, a dichotomous coordinate descent (DCD)-RLS estimation method, or a gradient descent estimation method.

10. The method of claim 6, wherein a center tap of the plurality of taps of the first transmission is a tap having a strongest magnitude included in the plurality of taps of the first transmission after synchronization, and
wherein a center tap of the plurality of taps of the second transmission is a tap having a strongest magnitude included in the plurality of taps of the second transmission after synchronization.

11. An electronic device in a wireless network, comprising:
a memory device, and
a processor configured to execute instructions stored on the memory device, wherein the instructions cause the processor to:
generate a first kernel based on a tap of a first transmission transmitted from a first transmitter and a plurality of taps of a second transmission transmitted from a second transmitter different from the first transmitter;
calculate a first weighted coefficient set based on the first kernel;
calculate a first self-interference transmission signal estimation based on the first weighted coefficient set; and
obtain a first cancellation signal by subtracting the first self-interference transmission signal estimation from a downlink received signal,
wherein the first transmitter is a first wireless communication device comprising a first controller module, a first storage module, and a first antenna module that transmits the first transmission in the wireless network, and the second transmitter is a second wireless communication device comprising a second controller module, a second storage module, and a second antenna module that transmits the second transmission in the wireless network.

12. The electronic device of claim 11, wherein the instructions further cause the processor to:
generate a second kernel based on a tap of the second transmission and a plurality of taps of the first transmission;
calculate a second weighted coefficient set based on the second kernel;
calculate a second self-interference transmission signal estimation based on the second weighted coefficient set; and
obtain a second cancellation signal by subtracting the second self-interference transmission signal estimation from the first cancellation signal.

13. The electronic device of claim 12, wherein the instructions further cause the processor to:
generate a third kernel based on the tap of the first transmission and the plurality of taps of the second transmission;
calculate a third weighted coefficient set based on the third kernel;
calculate a third self-interference transmission signal estimation based on the third weighted coefficient set; and
obtain a third cancellation signal by subtracting the third self-interference transmission signal estimation from the second cancellation signal.

14. The electronic device of claim 13, wherein calculating the first weighted coefficient set further comprises calculating the first weighted coefficient set based on the downlink received signal,
wherein calculating the second weighted coefficient set further comprises calculating the second weighted coefficient set based on the first cancellation signal, and
wherein calculating the third weighted coefficient set further comprises calculating the third weighted coefficient set based on the second cancellation signal.

15. The electronic device of claim 11, wherein a total number of the plurality of taps of the first transmission is equal to a total number of the plurality of taps of the second transmission.

16. The electronic device of claim 11, wherein the instructions further cause the processor to:
generate a second kernel based on a tap of the second transmission and a plurality of taps of the first transmission; and
calculate a second weighted coefficient set based on the second kernel,
wherein calculating the first self-interference transmission signal estimation further comprises calculating the first self-interference transmission signal estimation based on the first weighted coefficient set and the second weighted coefficient set.

17. The electronic device of claim 16, wherein a total number of the plurality of taps of the first transmission is equal to a total number of the plurality of taps of the second transmission.

18. The electronic device of claim 16, wherein calculating the first weighted coefficient further comprises multiplying a value corresponding to the tap of the first transmission with a plurality of values corresponding to each of the plurality of taps of the second transmission, and
wherein calculating the second weighted coefficient further comprises multiplying a value corresponding to the tap of the second transmission with a plurality of values corresponding to each of the plurality of taps of the first transmission.

19. The electronic device of claim 16, wherein at least one of the first weighted coefficient and the second weighted coefficient is calculated based on a recursive least squares (RLS) estimation method, a dichotomous coordinate descent (DCD)-RLS estimation method, or a gradient descent estimation method.

20. The electronic device of claim 16, wherein a center tap of the plurality of taps of the first transmission is a tap having a strongest magnitude included in the plurality of taps of the first transmission, and
wherein a center tap of the plurality of taps of the second transmission is a tap having a strongest magnitude included in the plurality of taps of the second transmission.

* * * * *